3,355,946
PITOT TUBES
Robert Charles Lazell, 8219 Joplin St.,
Houston, Tex. 77017
Substituted for abandoned application Ser. No. 633,234, Jan. 9, 1957. This application Jan. 19, 1965, Ser. No. 453,233
24 Claims. (Cl. 73—212)

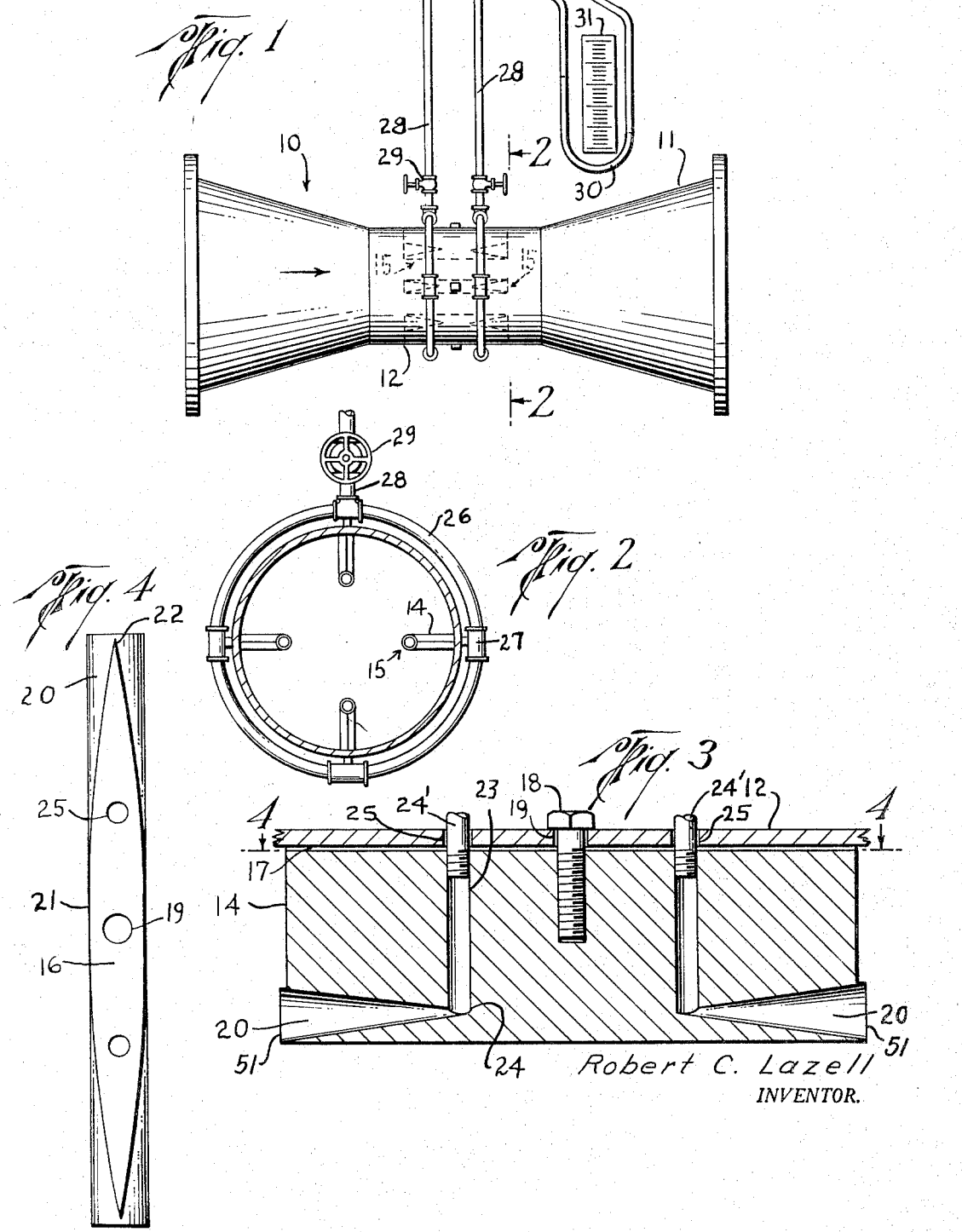

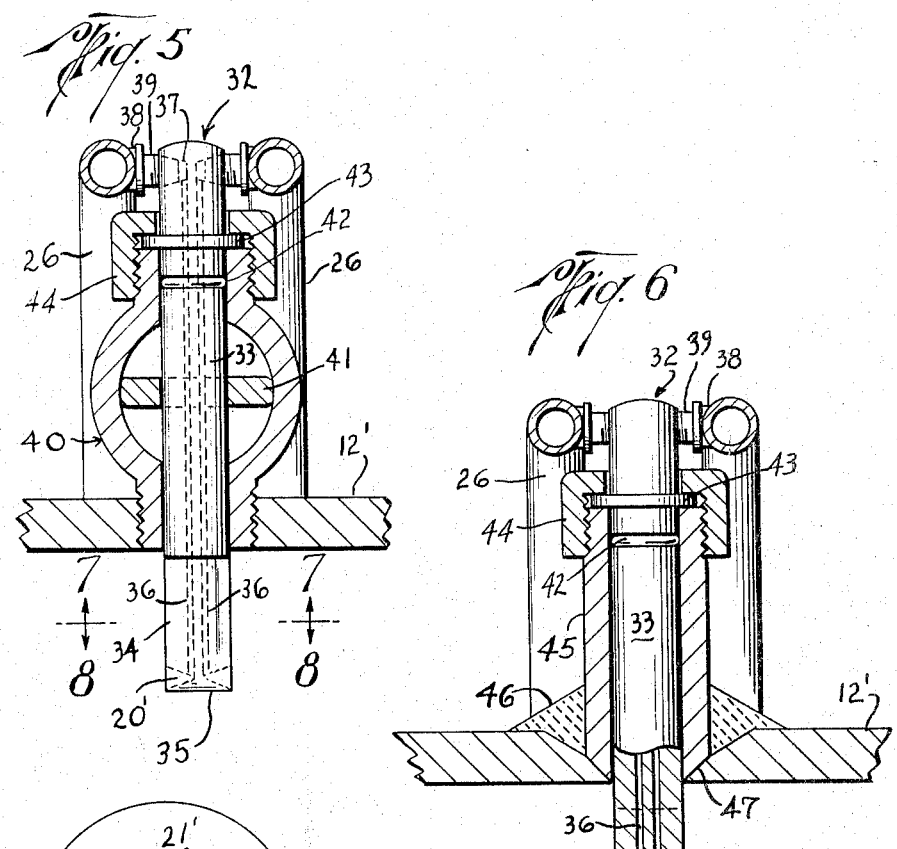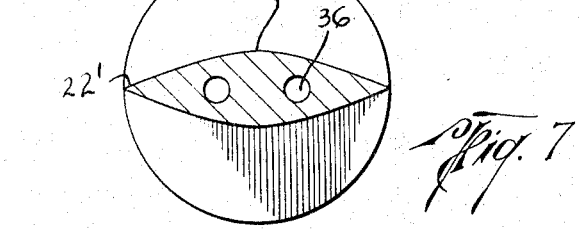

ABSTRACT OF THE DISCLOSURE

A flow measuring device which measures fluid velocity in a conduit in terms of pressure differential. One form of the invention is a Pitot tube, which is adapted for insertion into a conduit. It includes a generally cylindrical inner body having opposed cone shaped openings facing up and down stream respectively. Certain embodiments of the invention may include a plurality of such tubes in combination with a manifold system leading to read out means.

This invention relates to flow measuring devices which measure fluid velocity in a conduit in terms of pressure differential at different points therein, such devices providing a higher differential per throat size than conventional venturis and devices which measure static pressure drop.

It is consequently a primary object of this invention to provide a device which accurately measures fluid velocity in terms of pressure differential and which provides a higher differential per throat size than venturis and devices which measure static pressure drop.

It is also an object of this invention to provide a device of this class, as a Pitot tube, which may be inserted in a conduit receiving fluid flow therethrough, as a steam line, without first having to close down the line.

It is another object of this invention to provide a device of this class which may be installed within a flowing conduit, and the flow to be measured translated to the exterior of the conduit for measurement with the minimum of alteration of the conduit.

It is also a further object of this invention to provide a method of employing devices of this class by installation in conduits with the axis of flow into such devices positioned within a critical range with relation to the diameter of the conduit.

Other and further objects will be apparent when the specification herein is considered in connection with the drawings in which:

FIG. 1 is an elevation of one form of the invention installed to measure pressure differential in a venturi or reduced diameter pipe section;

FIG. 2 is a transverse sectional view taken along line 2—2 of FIG. 1;

FIG. 3 is a sectional elevation through one modification of orifice block of the invention;

FIG. 4 is a plan view taken along line 4—4 of FIG. 3;

FIG. 5 is an elevation, part in section, showing a second modification of the invention in one type of installation;

FIG. 6 is an elevation, part in section, showing the modification of the invention shown in FIG. 5 in another type of installation;

FIG. 7 is a sectional plan view taken along line 7—7 of FIG. 5; and

FIG. 8 is a sectional plan view taken along line 8—8 of FIG. 5.

Referring in detail to the drawings a pipe section 10 is shown having two reversely facing swaged nipples 11 joined together by a pipe section 12. Within the section 12 there are installed four orifice blocks or compound Pitot tubes 14 to provide two longitudinally spaced apart orifice or nozzle rings 15. The top 16 of the tube shown in FIG. 4 has a gasket 17 of the same contour fitted thereon as shown in FIG. 3 and a cap screw 18 is passed through a bore 19 through the wall of the pipe 12 and through a gasket 17 and is threaded into the orifice block or Pitot tube 14 to firmly fix the tube to the inner wall of the pipe 12.

Each Pitot tube 14 has at its lower end a conical shaped orifice 20 on the forward side and a corresponding conical shaped orifice 20 at its rear side and thereabove the orifice tube is streamlined from its mid-section 21 forwardly to a narrow edge or point 22 and is of the same contour rearwardly. Bores 23 extend from the upper surface of the tube 14 at right angles to the axes of the conical openings 20 and communicate with the conical openings at 24 near the apices or inner points thereof. Connection tubes 24' extend through bores 25 through the wall of the pipe 12 and through the gasket 17 and are threaded into the outer ends of the bores 23 and in this manner fluid connection is established with the exterior of the pipe 12. The external ends of conical openings 20 are formed with annular knife-like edges 51 which edges cause less turbulence in the fluid flow, resulting in more uniform test results.

As shown in FIG. 2 each orifice or nozzle ring 15 is surrounded by a pipe ring 26 which has T's 27 spaced apart at 90° therearound to receive the connections 24' thereinto. A conduit 28 extends from one of such T's outwardly and has a valve 29 therein. This construction is provided for both of the rings 15. The conduits 28 lead upwardly and then they curve downwardly to join in a loop 30 which forms a manometer. A suitable gage or graduated plaque 31 is within the loop 30 and so spaced and divided as to record the pressure differential between the upstream and downstream cones 20.

A second modification of the invention is shown in FIGS. 5–8 in which a Pitot tube 32 is provided which has a tubular part 33 externally of the inside of a pipe 12' and a streamlined section 34 to be extended within the pipe or conduit 12' to provide conical openings 20' corresponding to the openings 20 in the first modification, such conical openings 20' being provided in a tubular innermost part of the tube 32. Bores 36 extend axially of the tube 32 and consequently perpendicular to the axes of the conical openings 20' and join such openings as shown in FIG. 5. Such bores 36 extend to the top of the tube 32 where they join drilled and tapped bores 37 into which are threaded fittings, as the nipples 39. These nipples 39 connect the bores 36 to the T's 38 by virtue of being threaded into the drilled and tapped bores 37. The T's 38 join into pipe rings 26 such as the rings shown in FIG. 2 and the rings 26 are connected to a manometer 39 as shown in FIG. 1.

In case it is desired to install a tube 32 into a line which is flowing it is only necessary to drill through a corporation cock or valve 40 as shown in FIG. 5 which comprises a sleeve member and then insert the tube 32 therethrough. This renders the corporation cock or valve useless since the valve element 41 is drilled through, but there occurs a minimum of fluid loss in point of time from the instant the drill is withdrawn until the instant the tube 32 is inserted and installation thereof completed.

A seal ring having a seal 42 therein is provided to seal the corporation cock 40 against fluid leakage outwardly therethrough and a flange 43 is provided on the tube 32 above the seal 42 so that a nut 44 may be threaded thereon to lock the tube 32 firmly in position. The section 34 of the tube 32 is streamlined from a widest point 21' centrally thereof down to a narrow edge or point 22' both forwardly and rearwardly.

As shown in FIG. 6 the tube 32 may be installed on a welded outlet termed a weldolet which is welded onto a pipe section 12'. Such outlet comprises a nipple 45 having its outer end threaded and its inner end chamfered to fit into a seat 47 of the configuration shown, the welding material 46 then filling the recess surrounding the seat and extending outwardly thereof and above to firmly fix the nipple 45 in position. Then the upper end of the nipple may be closed with a suitable closure or cap and the transportation of fluid commenced in the line. When it is desired to measure flow in such pipe 12' the closure is removed, the tube 32 inserted, and a nut 44 threaded on the end of the nipple 45 to bear upon the flange 43 to lock the tube 32 in position.

Obviously this form of the invention may be removed from the pipe 12' when not connected to the rings 26, it only being necessary to unscrew the nut 44 and withdraw the tube 32 outwardly, and then thread on a closure cap in place of the nut 44. To facilitate withdrawal any suitable stud or handle may be affixed to the outer end area of the tube 32 for this purpose. Such withdrawal may be effected for various reasons, as when it may become necessary to scrape or clean the interior surface of the pipe 12'.

An installation as shown in FIGS. 1–4 may be set up in advance before the pipe 12 is installed in a conduit or pipe line. Otherwise an established flowing line may be shut down and such installation may then be made therein.

The form of the invention shown in FIGS. 5–8 is designed to be installed in a flowing line in a manner to permit the line to continue flowing under pressure. In this case the line is "hot" tapped and the working dimensions thereof are inside calipered at the points where the rings of Pitot tubes are to be installed. This measurement is necessary to determine how far the Pitot tube is to be inserted in the line in which flow is to be measured. In this regard as a general rule it has been determined by experience that the axes of the ports or conical shaped openings should be positioned from the inner wall of the pipe ⅛th of the throat or inner diameter of the pipe at the point of measurement when the mean velocity head is to be measured in terms of turbulent flow or ⅒th of such diameter from the inner wall of the pipe when laminar flow is to be measured. For crude petroleum measurement over wide ranges of viscosity the axes of the ports may be extended into the bore for 2/15th of the throat diameter to minimize the viscosity correction. The fluid viscosity controls the depth of the induced skin or wall friction and turbulence area and placing the nozzle or orifice axes at 2/15th of the inner diameter from the pipe wall avoids this area.

The provision of a Pitot tube which may be installed in a flowing line is of great importance in plants such as chemical plants and petroleum refineries and in municipal facilities since such plants may be kept flowing while measurements are taken.

The invention has a multiplicity of other uses such as measurement in water mains, fire lines, and test for dirty fluids by visual inspection, measurement in order to control surge in gas lines and to adjust the balance between compressor or pump manifolds of the control of feed back into hydraulic systems, measurement of air flow in air conditioning ducts, and for many other purposes.

The tube is reversible as to which nozzle or conical orifice is forward and which is rearward, since the orifice blocks are completely symmetrical as to orifices. Because of its simplicity of structure it can be installed in gate valves, plug valves, ball valves, and other structures in addition to pipe lines, and it can be fabricated of various metals, plastics, vitreous products, and the like, and from available materials in the field.

The determination of the function of the flow velocity versus differential for any given inner diameter of pipe can be obtained from a conventional velocity head curve, correction being made for specific gravity of the fluid handled.

The device produces a differential such as other primary devices of this class, as orifice plates, venturi tubes, flow nozzles, wherein the differential functions as the square root of the flow, and thus standard meters, charts, integrators, calculating formulae, and procedures may be employed.

There are two essential differences between this device and other head meters: (1) The mean velocity head is used as a criterion of flow, and (2) The differential produced is the result of impact pressure differences rather than static pressure differences. The static pressure cancels out in all cases and the differential pressure is obtained by dynamic impact on a series of streamlined nozzles spaced around the throat.

In the tube of this invention a total dynamic head, equal to static plus velocity head, will be impressed on the nozzle group pointing upstream, and a total head, equal to the static minus velocity head, will be impressed on the nozzle group pointing downstream.

Symbolically:

$$h_1 = S + k_1 \frac{V^2}{2g}$$

in which $h_1$ = total dynamic head on upstream group.
$S$ = static head in system.
$V^2/2g$ = velocity head, and
$k_1$ = ratio of velocity head at nozzle radius to average velocity head across the section.

Similarly, $$h_2 = S - k_2 \frac{V^2}{2g}$$

in which $h_2$ = total dynamic head on downstream group.
$k_2$ = constant whose value deviates from $k_1$ by an amount depending on effectiveness of jet action, which in turn, varies with shape and location of nozzles.

The meter head $Hm$ is the difference between $h_1$ and $h_2$, or $$Hm = S + k_1 \frac{V^2}{2g} - \left(S - k_2\right) \frac{V^2}{2g}$$
$$= S + k_1 \frac{V^2}{2g} - S + k_2 \frac{V^2}{2g}$$
$$= (k_1 + k_2) \frac{V^2}{2g} = \frac{KV^2}{2g}$$

in which $K$ = calibration constant.

From the foregoing analysis, it may be seen that flow tube differentials are independent of static pressures, since these cancel out in all cases. And since static pressures depend not only on the average velocity across a given section, but also on the velocity distribution, the elimination of this variable makes possible more accurate readings. Moreover, since all readings are taken at a section where the velocity curve is relatively flat, the accuracy of the flow tube is practically independent of the main to throat ratio. For normal and high main line velocities, the flow tube can be installed with or without contraction and still produce measurable differentials with a negligible loss. For large installations power savings thus effected become an appreciable item. Chilled water lines for air conditioning facilities have mean velocity head (impact) for 20 through 150 inches of water column differential at their maximum flows at full line size, and this invention has produced excellent test results in such usage.

The yearly cost of power lost, even in the comparatively efficient venturi, may be computed by the formula $C=0.4D^2$ where $C=$cost in dollars, and D is nominal diameter of main in inches. This assumes a main line velocity of 5 feet per second, and electrical energy costs at one cent/kw. hour. For other velocities and energy charges, the cost will vary as the cube of the former and as the first power of the latter. For large pipe lines the capitalized cost of such savings amounts to many times the first cost of the installation.

All readings are taken at the throat section, hence no corrections are required for changes in internal energy when metering expansive gases and vapors. The differential is always expressed in feet of fluid corresponding to throat conditions. In other words, the simple hydraulic formula $V=(2gh)^n$ applies for gases and vapors as well as liquids so long as $h$ is expressed in feet of fluid at throat density.

The differential produced in a flow tube, at a given rate, may be expressed as $h=k_1R^4h_v$ in which $h=$flow tube differential.
$R=D/d$ ratio.
$k_1=$flow tube constant.
$h_v=$effective velocity head in the main.

In other head meters the differential is equal to $$h^1=k_2(R^4-1)h_v$$

in which $k_2=$the meter constant and other terms have same meaning as above. In a nozzle or venturi $k_2$ is practically unity. In this type of flow tube $k_1=1.319$. The ratio of flow tube to venturi differential in this case is:

$$\frac{h}{h^1}=\frac{1.13R^4h_v}{(R^4-1)h_v}=\frac{1.319R^4}{(R^4-1)}$$

From the above relation it may be seen that as R approaches unity as a limit, the ratio of flow tube to venturi differential increases without limit.

The discharge coefficient of this tube, plotted in the conventional square root manner varies from .9 at and above Reynolds No. 10,000 to approximately .925 at Reynolds No. 8,700. Below that its value falls off more rapidly.

It should be noted, however, that when differentials are plotted versus capacity on logarithmic paper, all points lie on a straight line, indicating that the coefficient remains constant over the entire range covered by the test, if differentials are expressed to a power of velocity corresponding to slope of curve.

Head meters, in general, do not follow the square root law but rather a logarithmic function. Practically any primary device will show a constant coefficient, if head is expressed to the proper exponent, over a range far in excess of the requirements of commercial metering, and broad enough to satisfy the requirements of laboratory test work.

The flow tube of this invention has a demonstrated range of over 100 to 1 and the coefficient of the tube is constant for all Reynolds numbers above 10,000.

Operation of devices incorporating the invention herein show many advantages over the prior art. For example, in one installation of Pitot tubes of the instant invention, the pressure gauge readings had one-half the amplitude and twice the frequency of oscillation as a standard venturi type tube, which permitted much closer reading. In addition to less frequency, the device of the instant invention produced differential pressures of greater magnitude than other Pitot tubes under similar conditions. Thus, the instant invention provides new and unexpected improvements over the prior art since the venturi type tubes were heretofore regarded as the most stable device for fluid velocity measurement.

Moreover, it was discovered that the instant invention provides a Pitot tube that is more sensitive to changes in flow velocity than other head meters. In addition, the device is easily adaptable to flow reversals as in gas and pipeline operations. Hence, the art has been provided with a much more efficient Pitot tube.

Broadly the invention considers an improved Pitot tube of streamlined design having aligned upstream and downstream orifices of particular shape and the invention is not limited to the forms of Pitot tubes shown but others are considered as well as such may fall within the broad scope of the invention and within the broad scope of interpretation claimed and merited for the appended claims.

What is claimed is:

1. A solid, integrally formed orifice block for installation in a conduit, said orifice block including an inner, substantially cylindrical portion with its longitudinal axis parallel to the conduit axis, and a portion outwardly adjacent to said inner portion and having a cross-section of substantially the length thereof with widest width centrally and of substantially the dimension of the inner portion diameter and streamlined from said widest dimension to a narrow, fine line, feather edge forwardly and rearwardly, a forward and a rearward cone shaped orifice provided respectively in the forward and rearward ends of said inner portion with cone bases longitudinally outwardly and cone axes co-axial with said inner portion axis and terminating inwardly in spaced relation on opposite sides of a median plane through said Pitot tube and said widest dimension and transversely through said conduit, and forward and rearward radial flow passages extending within said Pitot tube in parallel, spaced relation on opposite sides of said median plane and through said outwardly adjacent portion to comprise, respectively, the only communication with the inner terminals of said forward and rearward cone shaped orifices.

2. An orifice block as claimed in claim 1 in which said block extends longitudinally radially into said conduit.

3. An orifice block as claimed in claim 1 in which said orifice block extends into said conduit from the inner wall thereof.

4. A Pitot tube comprising a solid, integrally formed orifice block including an inner, substantially cylindrical portion with its longitudinal axis parallel to the conduit axis, and an intermediate portion outwardly adjacent to said inner portion and having a cross-section of substantially the length thereof with widest width centrally and of substantially the dimension of the inner portion diameter and streamlined from said widest dimension to a narrow, fine line, feather edge forwardly and rearwardly, a forward and a rearward cone shaped orifice provided respectively in the forward and rearward ends of said inner portion with cone bases longitudinally outwardly and cone axes co-axial with said inner portion axis and terminating inwardly in spaced relation on opposite sides of a median plane through said Pitot tube and said widest dimension and transversely through said conduit, a round outer portion extending outwardly through said conduit and having forward and rearward radial flow passages extending within said Pitot tube in parallel, spaced relation on opposite sides of said median plane and through said outwardly adjacent intermediate portion to comprise, respectively, the only communication with the inner terminals of said forward and rearward cone shaped orifices, a flange on said round outer portion spaced inwardly of the outer outlets of said flow passages, and a sealing ring in a groove provided in the periphery of said round outer portion spaced inwardly of said outer outlets of said flow passages.

5. A Pitot tube comprising a solid integrally formed orifice block including an inner, substantially cylindrical portion with its longitudinal axis parallel to the conduit axis, and an intermediate portion adjacent to said inner portion and having a cross-section of substantially the length thereof with widest width centrally and of substantially the width of the diameter of said inner cylindrical portion and streamlined from the widest central section to a narrow, fine line, feather edge fore and aft, a forward and a rearward cone shaped orifice provided respectively in the forward and rearward ends of said cylindrical inner portion with cone bases longitudinally outward and cone axes coaxial with said inner portion axis and terminating inwardly in spaced relation on opposite sides of a median plane through said Pitot tube and said widest section and transversely through said conduit, and forward and rearward radial flow passages extending within said Pitot tube in parallel, spaced relation on opposite sides of said median plane and through said outwardly adjacent portion to comprise, respectively, the only communication with the inner terminals of said forward and rearward cone shaped orifices, a tapped hole being provided through the outer edge of said body intermediate said flow passages whereby said Pitot tube may be screw connected to said conduit.

6. Measuring apparatus comprising a plurality of integrally formed orifice blocks for installation in a conduit in equally angularly spaced apart position therein, each block including an inner, substantially cylindrical portion with its longitudinal axis parallel to the conduit axis, and a portion outwardly adjacent to said inner portion and having a cross-section of substantially the length thereof with widest width centrally and of substantially the dimension of the inner portion diameter and streamlined from said widest dimension to a narrow, fine line, feather edge forwardly and rearwardly, a forward and a rearward cone shaped orifice provided respectively in the forward and rearward ends of said inner portion respectively in the forward and rearward ends of said inner portion with cone bases longitudinally outwardly and cone axes co-axial with said inner portion axis and terminating inwardly in spaced relation on opposite sides of a median plane through said Pitot tube and said widest dimension and transversely through said conduit, and forward and rearward radial flow passages extending within said Pitot tube in parallel, spaced relation on opposite sides of said median plane and through said outwardly adjacent portion to comprise, respectively, the only communication with the inner terminals of said forward and rearward cone shaped orifices, a pipe ring surrounding the forward flow passages externally of said conduit and another pipe ring surrounding the rearward flow passages externally of said conduit, means connecting said forward and rearward flow passages to that pipe ring surrounding them, and conduit means leading from said pipe rings to form a manometer.

7. Measuring apparatus comprising solid, integrally formed orifice block means for measuring flow in a conduit, said orifice block means comprising at least one orifice block including an inner, substantially cylindrical portion with its longitudinal axis parallel to the conduit axis, and a portion outwardly adjacent to said inner portion and having a cross-section of substantially the length thereof with widest width centrally and of substantially the dimension of the inner portion diameter and streamlined from said widest dimension to a narrow, fine line, feather edge forwardly and rearwardly, a forward and a rearward cone shaped orifice provided respectively in the foward and rearward ends of said inner portion with cone bases longitudinally outwardly and cone axes co-axial with said inner portion axis and terminating inwardly in spaced relation on opposite sides of a median plane through said Pitot tube and said widest dimension and transversely through said conduit, and forward and rearward radial flow passages extending within said Pitot tube in parallel, spaced relation on opposite sides of said median plane and through said outwardly adjacent portion to comprise, respectively, the only communication with the inner terminals of said forward and rearward cone shaped orifices, said apparatus also including means externally of said conduit connected with said flow passages and adapted to give pressure readings whereby said flow may be calculated, said orifice means being spaced inwardly from the wall of said conduit with cone axes at least about one-tenth of the throat diameter of said conduit.

8. Measuring apparatus as claimed in claim 7 in which said cone axes are spaced inwardly from the wall of said conduit with cone axes substantially one-eighth of the throat diameter of said conduit.

9. Measuring apparatus as claimed in claim 7 in which said cone axes are spaced inwardly from the wall of said conduit with cone axes substantially two-fifteenths of the throat diameter of said conduit.

10. A solid, integrally formed Pitot tube for sealed extension into a fluid carrying conduit and including as successively adjacent portions, an inner, substantially cylindrical portion with its longitudinal axis parallel to the conduit axis, a central portion having a cross-section of substantially the length of said inner portion with widest width centrally and of substantially the dimension of the inner portion diameter and streamlined from said widest dimension to a narrow, fine line, feather edge forwardly and rearwardly, a forward and a rearward cone shaped orifice provided respectively in the forward and rearward ends of said inner portion with cone bases longitudinally outwardly and cone axes co-axial with said inner portion axis and terminating inwardly in spaced relation on opposite sides of a median plane through said Pitot tube and widest dimension and transversely through said conduit, and a round outer portion extending sealably outwardly through said conduit, said Pitot tube providing radial flow passages therein entering said outer portion and extending within said Pitot tube in parallel, spaced relation on opposite sides of said median plane and through said outer and central portion to comprise, respectively, the only communication with the inner terminals of said forward and rearward cone shaped orifices.

11. A solid, integrally formed Pitot tube for extension into a fluid carrying conduit and including an inner, substantially cylindrical portion with its longitudinal axis parallel to the conduit axis, and a portion outwardly adjacent to said inner portion within said conduit and having a cross-section of substantially the dimension of the inner portion diameter and streamlined from said widest dimension to a narrow, fine line, feather edge forwardly and rearwardly, a forward and a rearward cone shaped orifice provided respectively in the forward and rearward ends of said inner portion with cone bases longitudinally outwardly and cone axes co-axial with said inner portion axis and terminating inwardly in spaced relation to opposite sides of a median plane through said Pitot tube and said widest dimension and transversely through said conduit, and Pitot tube providing radial flow passages therein entering said outwardly adjacent portion and extending in parallel spaced relation on opposite sides of said median plane and through said outwardly adjacent portion to comprise, respectively, the only communication with the inner terminals of said forward and rearward cone shaped orifices, said Pitot tube including means in contact with said outwardly adjacent portion to hold it in sealed fixed position within said conduit and to extend said annular flow passage outwardly thereof.

12. Measuring apparatus to measure fluid flow in a conduit and comprising a plurality of Pitot tubes for installation in said conduit in equally, angularly spaced apart position therein, each Pitot tube extending sealably into said conduit and including an inner substantially cylindrical portion with its longitudinal axis parallel to the conduit axis, and a portion outwardly adjacent to said inner portion and having a cross-section of substantially the length thereof with widest width centrally and of substantially the dimension of the inner portion diameter and streamlined from said widest dimension to a narrow, fine line, feather edge forwardly and readwardly, a forward and a rearward cone shaped orifice provided respectively in the forward and rearward ends of said inner portion with cone bases longitudinally outwardly and cone axes co-axial with said inner portion axis and terminating inwardly in spaced relation on opposite sides of a median plane through said Pitot tube and said widest dimension and transversely through said conduit, and forward and rearward radial flow passages extending within said Pitot tube in parallel, spaced relation on opposite sides of said median plane and through said outwardly adjacent portion to comprise, respectively, the only communication with the inner terminals of said forward and rearward cone shaped orifices, said apparatus including a pipe ring surrounding the forward orifices externally of said conduit, and an other pipe ring surrounding said rearward orifices externally of said conduit, means respectively connecting the forward flow passages to the forward pipe ring and the rearward flow passages to the rearward pipe ring, and conduit means extending between said pipe rings and including differential pressure measurement and indicating means.

13. Measuring apparatus as claimed in claim 12 in which said Pitot tubes are installed to position the axes of said cone shaped orifices spaced within said conduit substantially one-eighth of the conduit throat diameter from the inner surface of the conduit wall to measure the turbulent fluid flow therein, and in which said differential pressure measurement indicating means is adapted to give pressure readings from which said turbulent flow may be calculated.

14. Measuring apparatus as claimed in claim 12 in which said Pitot tubes are installed to position the axes of said cone shaped orifices spaced within said conduit substantially one-tenth of the conduit throat diameter from the inner surface of the conduit wall to measure the laminar fluid flow therein, and in which said differential pressure measurement indicating means is adapted to give pressure readings from which said laminar flow may be calculated.

15. Measuring apparatus as claimed in clam 12 in which said Pitot tubes are installed to position the axes of said cone shaped orifices spaced within said conduit substantially two-fifteenths of the conduit throat diameter from the inner surface of the conduit wall to measure crude petroleum flow therein, and with said differential pressure measurement indicating means adapted to give pressure readings from which said crude petroleum flow may be calculated.

16. Measuring apparatus as claimed in claim 12 in which the means connecting said flow passages to said pipe rings comprise tubes extending outwardly through said conduit from the outer ends of said flow passages in the outwardly adjacent portions of said Pitot tubes within said conduit.

17. Measuring apparatus as claimed in claim 12 in which said Pitot tubes includes round outer portions through which said radial flow passages extend, and in which sleeve members are provided extending radially outwardly from said conduit to sealably receive said outer portions therethrough, and in which the means connecting said flow passages to said pipe rings comprise connection members between the outer ends of said flow passages outwardly of said sleeve members and said pipe rings.

18. Measuring apparatus as claimed in claim 12 in which said Pitot tubes include round outer portions through which said radial flow passages extend, and in which corporation cocks with valve elements drilled through are provided extending radially outwardly from said conduit to sealably receive said outer portions therethrough, and in which the means connecting said flow passages to said pipe rings comprise connection members between the outer ends of said flow passages, outwardly of said corporation cocks, and said pipe rings.

19. Measuring apparatus as claimed in claim 12 in which said Pitot tubes include round outer portions through which said radial flow passages extend, and in which nipples are provided with inner ends welded to said conduit and extending radially outwardly therefrom to sealably receive said outer portions therethrough, and in which the means connecting said flow passages to said pipe rings comprise connection members between the outer ends of said flow passages, outwardly of said nipples, and, said pipe rings.

20. A Pitot tube for insertion into a conduit comprising:
support means for mounting inside said conduit and having a pair of longitudinally spaced apart and radially extending channels forming rearward and forward radial flow passages therethrough;
a generally cylindrical inner body mounted on the radially inward end of said support means with the axis thereof generally parallel with the axis of said conduit and having rearward and forward cone shaped orifices in opposite ends thereof;
the bases of said cones being spaced longitudinally outward from each other with cone axes generally coaxial with said cylindrical inner body;
said cones terminating inwardly in spaced relation in said body, with the apex end of said rearward cone being in communication with said rearward radial flow passage and the apex end of said forward cone being in communication with said forward radial flow passage; and
the ends of said cylindrical inner body which form the bases of said cones having annular knife-like edges.

21. The apparatus as claimed in claim 20 wherein:
said support means is of streamline configuration in radial cross-section;
said streamlining extending forwardly from the central portion thereof to fine line, feather edges rearwardly and forwardly.

22. The apparatus as claimed in claim 21 including:
means connected to the radially outward ends of said radial flow passages for indicating the dynamic impact pressure difference between the forward and rearward cones during passage of fluid through said conduit.

23. A pitometer for mounting in a conduit, comprising:
a plurality of support means circumferentially spaced around said conduit and extending radially thereinto;
each of said support means having a pair of longitudinally spaced apart and radially extending channels forming rearward and forward radial flow passages therethrough;
a generally cylindrical inner body mounted on the radially inward end of each of said support means with the axis thereof generally parallel with the axis of said conduit, each cylindrical inner body having rearward and forward cone shaped orifices in opposite ends thereof;
the bases of said cones being spaced longitudinally outward from each other with cone axis generally coaxial with said cylindrical inner body;
said cones terminating inwardly in spaced relation in said body, with the apex end of said rearward cone being in communication with said rearward radial flow passage and the apex end of said forward cone being in communication with said forward radial flow passage; and
the rearward and forward ends of said cylindrical inner body which form the bases of said cones having annular knife-like edges;
a rearward pipe ring surrounding said conduit and communicating with said rearward flow passages; and
a forward pipe ring surrounding said conduit and communicating with said forward flow passages.

24. The apparatus as claimed in claim 23 wherein:
  each of said support means is of streamlined configuration in radial cross-section;
    said streamlining extending from the central portion thereof to fine line, feather edges rearwardly and forwardly.

References Cited

UNITED STATES PATENTS

| | | | |
|---|---|---|---|
| 817,470 | 4/1906 | Cole et al. | 73—212 |
| 1,041,470 | 10/1912 | Hiller | 73—212 |
| 1,056,513 | 3/1913 | Dodge | 73—212 |
| 2,260,019 | 10/1941 | Gentile | 73—212 |
| 2,441,042 | 5/1948 | Stoll | 73—212 |
| 3,083,568 | 4/1963 | Soredal | 73—212 |

FOREIGN PATENTS

| | | |
|---|---|---|
| 21,122 | 6/1882 | Germany. |
| 587,607 | 1/1925 | France. |

RICHARD C. QUEISSER, *Primary Examiner.*

E. GILHOOLY, *Assistant Examiner.*

UNITED STATES PATENT OFFICE
CERTIFICATE OF CORRECTION

Patent No. 3,355,946                          December 5, 1967

Robert Charles Lazell

It is hereby certified that error appears in the above numbered patent requiring correction and that the said Letters Patent should read as corrected below.

Column 5, lines 36 to 38, the formula should appear as shown below instead of as in the patent:

$$\frac{h}{h^1} = \frac{1.319 R^4 h_v}{(R^4-1) h_v} - \frac{1.0\ R^4}{(R^4-1)}$$

same column 5, line 69, for "frequency" read -- amplitude --; line 71, for "other Pitot tubes" read -- the venturi tube --; column 7, lines 34 and 35, strike out "respectively in the forward and rearward ends of said inner portion".

Signed and sealed this 7th day of January 1969.

(SEAL)
Attest:

EDWARD M. FLETCHER, JR.                  EDWARD J. BRENNER
Attesting Officer                          Commissioner of Patents